Patented Dec. 21, 1943

2,337,296

UNITED STATES PATENT OFFICE 2,337,296

DRILLING FLUID

Harvey T. Kennedy, Oakmont, and Abraham J. Teplitz, Penn Township, Allegheny County, Pa., assignors to Gulf Research & Development Company, Pittsburgh, Pa., a corporation of Delaware No Drawing. Application November 6, 1941, Serial No. 418,074

6 Claims. (Cl. 252—8.5)

This invention relates to drilling fluids; and it comprises as a new composition of matter for use in drilling wells, a colloidal aqueous suspension of solids capable of retaining its colloidal character in the presence of substantial amounts of extraneous salines, said composition comprising a clay suspended in brine containing karaya gum dispersed therein, and usually containing additional finely divided suspended weighting material; all as more fully hereinafter set forth and as claimed.

In drilling wells by the rotary method, a drill is operated in the well through the agency of a long string of pipe rotated at the surface. A so-called "drilling fluid" is continuously circulated down the pipe and up between the pipe and the bore. This circulated fluid or liquid has several important functions and the degree to which it performs these functions is a significant factor in the success of the drilling operation. Among its functions are, to suspend and carry up rock cuttings, to release such cuttings in the settling pits, to lubricate and cool the bit, to plaster the walls of the bore whereby to keep back water and prevent sloughing, and, by reason of the hydrostatic head imposed, to hold back high pressure gas or other undesirable fluids which otherwise would leak into the well.

In some cases plain water or mud made with local clays is satisfactory as a drilling liquid, but more commonly modified clay muds, or mud-like suspensions of non-clay materials, are employed in an effort to fulfill the above conditions more closely than can be done with simple clay muds. Bentonite (a special type of clay) is often used, to impart added thixotropy to muds, that is, the property of setting to a quasi-solid gel on standing, which gel liquefies on agitation or circulation of the mud. Sometimes heavy powders, such as barytes or iron oxide are incorporated to increase the density above that possible with simple clay suspensions. In all cases, the drilling liquid is a colloidal suspension. Its useful properties are due to its colloidal character and are maintained to the extent that its colloidal character is preserved in use.

Unfortunately, these drilling fluids are profoundly and adversely affected upon coming in contact with beds of solid salt or with the brines commonly encountered in deep drilling. Salines exert a strong flocculating action on the colloidal particles of clay and bentonite. This destroys the colloidal character of the mud, and hence destroys its desirable properties. When flocculation takes place, particles of clay, bentonite and weighting material rapidly settle out with the result that the drilling fluid fails to seal the fine pores of rock, the water content of the drilling fluid may be lost into porous formations and a cake may be left on the wall of the bore sufficiently thick to stick the drill stem. Furthermore, since the mud loses its thixotropic properties, it may be rendered unpumpable, due to increase in viscosity. In some cases, the entire well has been lost, due to these effects produced on the mud upon contamination with salt.

In addition to the difficulties incurred with fresh water muds upon being contaminated with salt or brine, much difficulty has been experienced with heaving or caving of certain types of shale when encountered with fresh water muds. Saline muds of various compositions have been proposed for such use, but none has proved entirely satisfactory.

One object of the present invention is the provision of a drilling fluid, the liquid part of which is a brine, and containing clay and karaya gum, which drilling fluid is characterized by maintenance of good colloidal and wall-building properties in the presence of salt and other brines and all the other substances generally encountered in oil wells.

Another object is the provision of a brine-base mud containing karaya gum and capable of maintaining in suspension substantial quantities of clay and weighting materials; quantities corresponding to a mud density of 20 pounds per gallon or more.

Another object is the provision of a brine-base drilling fluid which makes use of dispersed karaya gum to hold finely divided materials in suspension and which is free of substances chemically reactive with the usual materials encountered in oil wells.

These and other objects are accomplished by the present invention, which is based on the discovery that with the aid of karaya gum, permanent liquid suspensions of clay and other finely divided solids can be prepared in brine; which liquids have the properties desired in drilling muds and which maintain these properties in the presence of NaCl, calcareous and magnesiferous brines. The drilling fluids of the invention are especially useful in drilling through salt beds or brine beds, in drilling through heaving shales, and in situations where muds have to be prepared with salt water.

In one good way of preparing the muds of the present invention, a gum is dispersed in a NaCl brine, forming a stable gelatinous dispersion. A clay is dispersed in the brine, in amount to impart the desired wall-building properties and to increase the density somewhat. Density can be further increased by suspension of a weighting material, such as iron oxide or barytes, in the liquid. Stable muds of density 20 pounds per gallon or higher are readily prepared in this manner. The higher density of the brine itself, as compared with water, contributes to the heaviness of the mud. Bentonite can be substituted in whole or in part for ordinary clay, if desired.

In some cases, in making up the mud a rather weak brine is used, of concentration roughly that of sea water, for example, but the mud so prepared tolerates much higher concentrations of dissolved salines. If desired, the mud can be made up direct with saturated brine.

The invention is applicable to common clays and to bentonite, a special variety of clay. In the appended claims the generic class of clays includes these materials.

Below are set forth in Table I comparative data on the characteristics of a typical mud prepared in accordance with the present invention, and certain prior art muds; and in Table II characteristic data on muds of various compositions within the purview of the present invention. Table III gives comparative data on a typical good mud of the prior art. In considering these data, it is desirable to explain the significance of the qualities measured and the manner in which they are measured.

1. Of the several properties dependent upon the degree of dispersion of the solid content of drilling fluids, the most useful as a basis for comparison is the loss of water (or other dispersion medium) which occurs when the drilling fluid is forced against a permeable surface. An ideal mud would lose no water when forced against a permeable surface; neither the mud nor the liquid constituent thereof would penetrate past the surface. The extent to which the liquid constituent separates, on forcing a mud against a permeable surface, is a measure of the utility of the mud. The thickness of the cake of solids formed on the permeable surface in such test is closely related to the water loss. It is an equally satisfactory gage of the utility of the drilling fluid. In the following tests, these properties were measured with the aid of a "Baroid" brand high-pressure standard wall tester, involving forcing the liquid against a suitably supported standard filter paper of area 22.5 square centimeters, under a pressure of 100 pounds per square inch, and collecting water which passed through the paper. The difference, in milliliters, between the total water separated after 15 minutes and that separated in 5 minutes, was taken as the value for water loss. The thicknesses of the cake left on the paper were measured in millimeters. The water loss and cake thickness have been found to correlate with similar data obtained when the muds were brought against cores of actual formations, and can thus be used as indices of behavior of a drilling fluid in a well.

2. Gel strength, that is to say, the degree to which a gelatinous drilling fluid resists flow after a short period of quiescent standing, is a measure of the degree of colloidal stability and is likewise a valuable criterion. It must not be too low because the weighting material would then settle out; and it must not be too high, or the mud becomes unpumpable or will not settle out the drill cuttings. Likewise, the viscosity must not be so high as to prevent easy circulation of the drilling fluid.

In the tests, the viscosity was measured at 600 revolutions per minute and room temperature on the Stormer viscometer, a standard instrument for this purpose. Gel strength was measured by allowing the mud to stand quiescent in the bowl of the same viscometer for ten minutes, and then determining the weight in grams on the driving cord required to start the drum rotating.

3. Free water was determined by allowing a sample of the mud to stand undisturbed for the time indicated in a graduate, any clear or opalescent liquid above the mud being recorded as free water. The volume of solids separated was determined by tipping the graduate horizontally for two minutes and measuring the percentage of solid material in the bottom which did not flow freely.

Table I, below, shows the comparison of properties of muds made according to previous practice, with the new mud made according to our invention. There is also shown the effect of adding the same amount of salt to the muds of the prior art which is present in the mud of our invention.

Table I

|  | Karaya mud (present invention) | Bentonitic mud (prior art) | Bentonitic mud plus salt (prior art) |
| --- | --- | --- | --- |
| Viscosity, cp | 36.0 | 10.5 | 4.0 |
| Free water separated, 24 hrs., per cent | 2.0 | 0.0 | 65.0 |
| Water loss, ml | 1.7 | 6.2 | 21.0 |

The karaya mud was made up by mixing together 20 parts by weight clay, 0.75 part gum karaya and 79.25 parts brine containing 2.65 per cent chlorides expressed as sodium chloride. The weight of the mud was then increased to 10.5 lb. per gallon by the addition of powdered barytes.

The bentonitic mud contained 4 per cent by weight of bentonite, and sufficient powdered barytes to bring the weight to 10.5 lb. per gallon.

In preparing these muds, the base (clay or bentonite) and weighting material (powdered barytes) were mixed with the aqueous liquid (fresh water or brine) and agitated on a high-speed shaker for one hour.

The excellent wall-building properties of the karaya mud, even as compared with fresh water bentonite mud, and the comparative freedom from settling, are evident from the above data. The complete flocculation of the bentonitic mud by 2.65 per cent of chlorides in the water is shown by the settling out of the solid matter, leaving 65 per cent of clear water, and by the increase in water loss from 6.2 to 21 ml. Using clay instead of bentonite in prior muds, results are obtained similar to those given above for bentonite.

Drilling fluids may be made up according to our invention using a wide variety of brines. In the following Table II are illustrated the comparative properties of typical drilling fluids within the purview of our invention. In the table, density is given in pounds per gallon, viscosity in centipoises, gel strength in grams, water loss in milliliters, and cake thickness in millimeters. The free water and solids separated are given in per cent by volume; this measurement being made after 96 hours standing. The seawater used contained, in grams per liter, NaCl 21.9, $CaCl_2$ 0.9 and $MgCl_2$ 4.0.

Table II

| Mud composition (per cent by wt.) | Dens. | Vis. | Gel. str. | H₂O loss | Cake | Free-H₂O sep. | Solids sep. |
|---|---|---|---|---|---|---|---|
| 1. Clay, 35.0<br>Seawater, 64.8<br>Gum karaya, 0.2 | 10.75 | 28 | 52 | 3.2 | 2.4 | 2.0 | 0.0 |
| 2. Clay, 23.0<br>Barytes, 7.9<br>Seawater, 68.8<br>Gum karaya, 0.3 | 10.5 | 27 | 21 | 2.3 | 1.0 | 4.5 | 0.0 |
| 3. Clay, 13.0<br>Barytes, 46.8<br>Seawater, 40.0<br>Gum karaya, 0.2 | 15.0 | 60 | 74 | 4.0 | 4.6 | 0.5 | 0.0 |
| 4. Clay, 29.4<br>Sat. NaCl soln., 70.1<br>Gum karaya, 0.5 | 13.0 | 87 | 104 | 6.6 | 4.2 | 0.0 | 0.0 |
| 5. Clay, 24.8<br>Seawater, 74.8<br>Gum karaya, 0.2<br>Gum arabic, 0.2 | 10.5 | 20 | 21 | 2.0 | 1.6 | 7.0 | 0.0 |

For comparison, there are given below characteristic test data on a typical weighted bentonite drilling liquid of the prior art, in the presence of varying concentrations of salt. The liquid was made up with fresh water, 2 per cent bentonite and sufficient finely divided barytes to bring the density up to 12 pounds per gallon. Dry common salt was added in the stated proportions, and the resulting mixture tested after thorough mixing to dissolve the salt.

Table III (prior art)

| Salt, percent by wt. | Vis. | Gel strength, 10-min. | H₂O-loss, 10 min. interval | Cake thick. | Free-H₂O sep. (30 hr.) |
|---|---|---|---|---|---|
| 0 | 7.2 | Less than 16 | 4.5 | (¹) | 4 |
| 1.0 | 14.7 | 39.5 | 5.2 | 2.0 | 4 |
| 5.0 | 8.2 | Less than 16 | 24.9 | 7.4 | 50 |

¹ Cake too soft to measure.

This shows how, in conventional prior art bentonite drilling liquids, a salt concentration of 5 per cent causes complete deflocculation. The water loss is increased over five-fold, a hard cake of over a quarter-inch thick is formed, and on standing 30 hours the mud separates into equal volumes of clear water and flocculated solid.

In general, we find the useful range of concentrations for the gum constituent of our drilling fluids to lie between 0.10 and 2.0 per cent by weight of the composite fluid. As the concentration is lowered below the stated limit, the benefits obtained diminish rapidly and while there is no critical lower concentration value at which all improvement disappears, nevertheless in most cases the improvement obtained by the incorporation of less than 0.1 per cent by weight of gum is insignificant.

In concentrations much over 2.0 per cent by weight, the gum is apt to impart to the drilling fluid a viscosity too high for general use. Increased amounts of gum above this concentration afford little betterment in the usually desirable properties of the drilling fluid.

We have found that in some instances karaya gum when mixed with an equal amount of gum arabic will impart to drilling fluids prepared according to our invention substantially better properties than are imparted by an equal concentration of karaya gum alone. A drilling fluid composition containing such a mixed gum constituent is illustrated by example 5 in Table II above.

When a weighting material is used in addition to clay, bentonite or other suspensible base, it is usually necessary to incorporate more gum in an equivalent volume of drilling fluid. However, the concentration of gum in parts by weight of the composite drilling fluid remains about the same or in some instances even slightly less than necessary with fluid containing no weighting material.

What we claim is:

1. As a new drilling fluid composition, a colloidal dispersion stable to salines encountered in drilling comprising brine, karaya gum dispersed in the brine, and finely divided solid matter suspended therein.

2. As a new drilling fluid composition, a colloidal dispersion stable to extraneous salines encountered in drilling comprising brine, finely divided suspensible solid matter and karaya gum in amount between 0.10 and 2.0 per cent by weight of the composite fluid.

3. An improved drilling fluid comprising brine, a clay and between 0.10 and 2.0 per cent by weight of a gum mixture consisting of equal parts gum karaya and gum arabic.

4. An improved drilling composition comprising brine, a clay, finely divided barytes in amount sufficient to impart a weight of at least 13 pounds per gallon to the composition and karaya gum in amount sufficient to maintain said clay and said barytes in stable suspension in said brine in the presence of extraneous salines of the type encountered in drilling wells.

5. In drilling wells, the method which comprises circulating through the well during drilling, a drilling liquid comprising brine, karaya gum dispersed therein, and suspended finely divided solid matter in amount sufficient such that the liquid has a density substantially greater than that of water.

6. A drilling mud having a substantial salt concentration to which has been added karaya gum.

HARVEY T. KENNEDY.
ABRAHAM J. TEPLITZ.